United States Patent
Van Tichelen et al.

(10) Patent No.: US 7,157,829 B2
(45) Date of Patent: Jan. 2, 2007

(54) AXIAL FLUX PERMANENT MAGNET GENERATOR/MOTOR

(75) Inventors: Paul Van Tichelen, Leuven (BE); Eef Peeters, Dessel (BE)

(73) Assignee: VLAAMSE Instelling Voor Technologisch Onderzoek (V.I.T.O), Mol (BE)

( * ) Notice: Subject to any disclaimer, the term of this patent is extended or adjusted under 35 U.S.C. 154(b) by 0 days.

(21) Appl. No.: 10/490,722

(22) PCT Filed: Oct. 18, 2002

(86) PCT No.: PCT/BE02/00159

§ 371 (c)(1),
(2), (4) Date: Aug. 26, 2004

(87) PCT Pub. No.: WO03/034575

PCT Pub. Date: Apr. 24, 2003

(65) Prior Publication Data

US 2005/0029886 A1 Feb. 10, 2005

(30) Foreign Application Priority Data

Oct. 18, 2001 (EP) ............................. 01870222

(51) Int. Cl.
*H02K 1/22* (2006.01)
*H02K 21/12* (2006.01)

(52) U.S. Cl. ............. 310/268; 310/156.32; 310/156.34
(58) Field of Classification Search ........... 310/156.08, 310/156.32–156.35, 168, 216, 218, 261, 310/267, 268

See application file for complete search history.

(56) References Cited

U.S. PATENT DOCUMENTS

| 1,566,693 | A |   | 12/1925 | Plestsher |
| 2,077,981 | A |   | 4/1937  | Bergen |
| 3,762,042 | A | * | 10/1973 | Abe et al. ..................... 29/598 |
| 3,867,655 | A |   | 2/1975  | Stengel et al. |
| 4,095,150 | A | * | 6/1978  | Senckel ........................ 310/12 |
| 4,451,749 | A |   | 5/1984  | Kanayama et al. |
| 5,397,953 | A |   | 3/1995  | Cho |
| 5,729,065 | A | * | 3/1998  | Fremery et al. ........... 310/90.5 |
| 5,801,473 | A | * | 9/1998  | Helwig ....................... 310/254 |
| 5,982,070 | A | * | 11/1999 | Caamano .................... 310/216 |
| 6,064,121 | A | * | 5/2000  | Shervington et al. ....... 290/1 A |
| 6,100,620 | A | * | 8/2000  | Radovsky ................... 310/268 |

FOREIGN PATENT DOCUMENTS

| EP | 0 133 571 | 2/1985 |
| EP | 0 952 659 | 10/1999 |
| GB | 1110340   | 9/1965 |
| JP | 58201567  | 11/1983 |

(Continued)

*Primary Examiner*—Tran Nguyen
(74) *Attorney, Agent, or Firm*—Merchant & Gould P.C.

(57) ABSTRACT

The present invention is related to a permanent magnet electrical generator/motor comprising a stator, a rotor, a rotational axis and an air gap between stator and rotor so that the magnetic flux across said air gap is essentially oriented along said rotational axis, said rotor preferably comprising a plurality of permanent magnets to form rotor poles, said generator/motor being characterised in that said stator comprises a disc (1), and a plurality of magnetic cores (2), said cores (2) being attached to said disc (1) by attachment means, said cores comprising coils (6) wound round the legs of said cores. Furthermore, said machine comprises means for distributing the flux across the air gap between rotor and stator. Preferably, this takes on the form of flux distribution plates (28,29), placed between rotor and stator.

21 Claims, 9 Drawing Sheets

FOREIGN PATENT DOCUMENTS

| | | | | | |
|---|---|---|---|---|---|
| JP | 01034160 | 2/1989 | WO | 01/06623 | 1/2001 |

* cited by examiner

AXIAL FLUX PERMANENT MAGNET GENERATOR/MOTOR

FIELD OF THE INVENTION

The present invention is related to an axial flux permanent magnet generator/motor, for example for use with internal combustion engines, where this type of machine is incorporated in the flywheel.

STATE OF THE ART

The axial flux permanent magnet generator and motor has been described in various forms. It consists of a stator comprising a plurality of coils, and a rotor comprising several permanent magnets, wherein an air gap is present between stator and rotor. The notion of 'axial flux' is not always defined in the same way. In this text, the expression 'axial flux' is related to machines wherein the flux across the air gap is essentially parallel to the machine's rotational axis.

The closest prior art when it comes to this type of machine has been disclosed in the publication entitled 'An Axial Flux Interior PM Synchronous Machine', by D. H. Kang et al., ICEM 2000, 28–30 Aug. 2000. It comprises two stators, each made as a single hollow cylinder with radial slots cut out of one of the ring-shaped surfaces. The coils are then wound round the radial extensions left in between the removed slots. The manufacture of such a stator is complex as well as expensive, especially in small series.

AIMS OF THE INVENTION

The present invention aims to provide a new axial flux permanent magnet generator/motor, with reduced complexity and cost compared to the prior art, whilst presenting solutions for problems intrinsic in the simplified design according to the invention.

SUMMARY OF THE INVENTION

The present invention is related to a permanent magnet electrical generator/motor comprising a stator, a rotor, a rotational axis and an air gap between stator and rotor so that the magnetic flux across said air gap is essentially oriented along said rotational axis, said rotor comprising a plurality of locations for placing permanent magnets or elements of magnetic material to form rotor poles, said generator/motor comprising a first non-magnetic disc and a plurality of magnetic cores, said cores being attached to said first disc by attachment means, said cores comprising coils, said generator/motor being characterized in that it further comprises a number of flux distribution plates in between the stator and the rotor, said plates being made of magnetic material.

These flux distribution plates may be in the form of a separate plate placed before each pole. Alternatively, these flux distribution plates may be designed as an inner and an outer flux distribution plate, made of magnetic material, said plates being present in between the stator and the rotor, said plates comprising radial extensions, the extensions of the inner plate pointing radially outward with respect to the machine's rotational axis, and the extensions of the outer plate pointing radially inward, so that each extension of said inner plate is adjacent an extension of said outer plate, with an air gap in between each pair of said adjacent extensions. The edges of said air gap, which are formed by the edges of two adjacent extensions are preferably parallel to each other.

The flux distribution plates may be attached to the rotor, so that each of said extensions covers at least the area of one permanent magnet location.

Alternatively, the flux distribution plates may be attached to the stator, so that each of said extensions covers at least the area of the cross section of one leg of a core.

According to one embodiment, the contour of said extensions comprises two straight portions, and a circular portion connecting said two straight portions, so that two adjacent straight portions of two adjacent extensions are parallel to each other and at an angle to any radius of said rotor which is crossing said two adjacent straight portions.

Flux distribution plates according to the invention may comprise adjacent strips of magnetic material. According to the preferred embodiment, said flux distribution plates comprise cuts through the complete thickness of the plates, in those parts of the plates which face the rotor poles.

The invention is equally related to a permanent magnet electrical generator/motor comprising a stator, a rotor, a rotational axis and an air gap between stator and rotor so that the magnetic flux across said air gap is essentially oriented along said rotational axis, said rotor comprising a plurality of locations for placing permanent magnets or elements of magnetic material to form rotor poles, said generator/motor comprising a first non-magnetic disc and a plurality of magnetic cores, said cores being attached to said first disc by attachment means, said cores comprising coils, said generator/motor being characterized in that the rotor comprises locations which are shaped so that their contour parallel to the rotor surface comprises two concentric circular portions and two connecting portions connecting the end points of said circular portions, wherein two adjacent connecting portions of two adjacent magnets are parallel to each other.

Said means for attaching said cores to said first disc may comprise L-profiles and bolts.

A generator/motor according to the invention may further comprise a ring of magnetic material, connected to the rotor on the side opposite the stator. This ring may also be made of laminated magnetic material.

According to one embodiment, the generator/motor according to the invention further comprises a second non-magnetic disc, said cores being present between said first and second disc. According to another embodiment, said coils are attached to said cores by glueing.

A generator/motor according to the invention may further comprise a second stator, which is placed opposite the first stator on the other side of said rotor. Said second stator may be rotated over an angle around the rotational axis of said generator/motor, with respect to said first stator.

A generator/motor according to the invention may further comprise at least one electronic converter, which works in "boost-mode" at low speed and as a rectifier at high speed.

The rotor may comprise in every one of said locations a permanent magnet. Alternatively, the rotor may comprise a number of permanent magnets and a number of elements made of magnetic material.

In another design according to the invention, the rotor may comprise only elements made of magnetic material and placed into said permanent magnet locations, in such a way that the number of rotor poles is different from the number of stator poles.

The cores which are used on the stator may be U-shaped cores or E-shaped cores.

In the case of 3 or more phase machine, the generator/motor according to the invention preferably further comprises a ring made of laminated magnetic material, said ring connecting the cores of said stator.

SHORT DESCRIPTION OF THE DRAWINGS

FIG. 4 represents a first sectional view of the stator of the invention, as shown in FIG. 3a.

FIG. 5 represents a second sectional view of the stator of the invention, as shown in FIG. 3a.

DETAILED DESCRIPTION OF THE INVENTION

Figure 1:
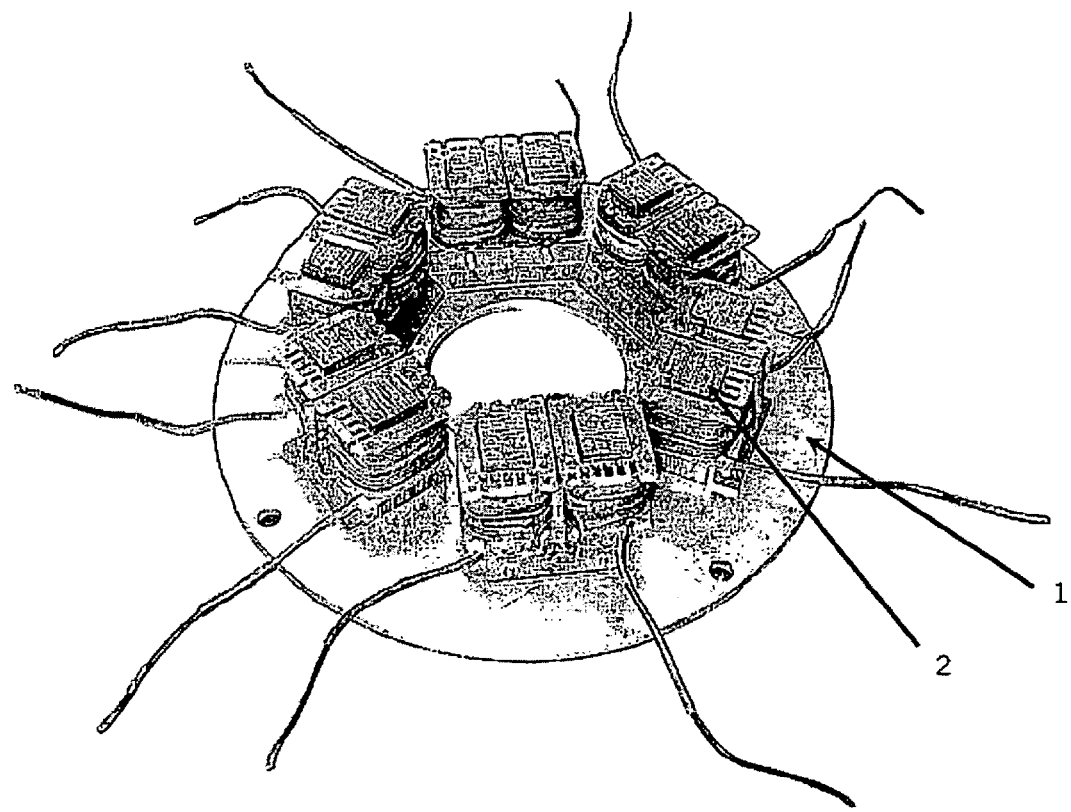
FIG. 1 shows a photograph of a partly assembled stator according to the invention.

The present invention generally presents a concept for an axial flux permanent magnet generator/motor, wherein a number of cores 2 are attached onto a disc 1, in order to form the stator. The disc 1 is preferably circular shaped, but the function of this disc can be performed by any plate made of a non-magnetic material. Also, the disc or plate 1 may be made of a magnetic material, which is covered by an insulation. The photograph of FIG. 1 illustrates a partly assembled stator according to the invention, comprising six U-cores. The fact that separate cores are used allows the use of standard cores, thus leading to a straightforward and inexpensive design.

The main problem of using such a design however, resides in the large fluctuation of the air gap between such a stator and the rotor, which is to be placed facing the cores on the stator. The rotor will preferably comprise a number of permanent magnets of a given form, at equal distances on a circle which is co-axial with respect to the machine's rotational axis. The large air gap fluctuation is then being caused by the large open spaces left in-between adjacent cores 2 on the disc 1, as well as in between the legs of one core 2, making the changeover between two adjacent poles difficult. The present invention solves this problem by providing an extra feature in the form of means for distributing the flux in an optimal way across the whole of the air gap's cross section perpendicular to the machine's rotational axis.

Figure 2:
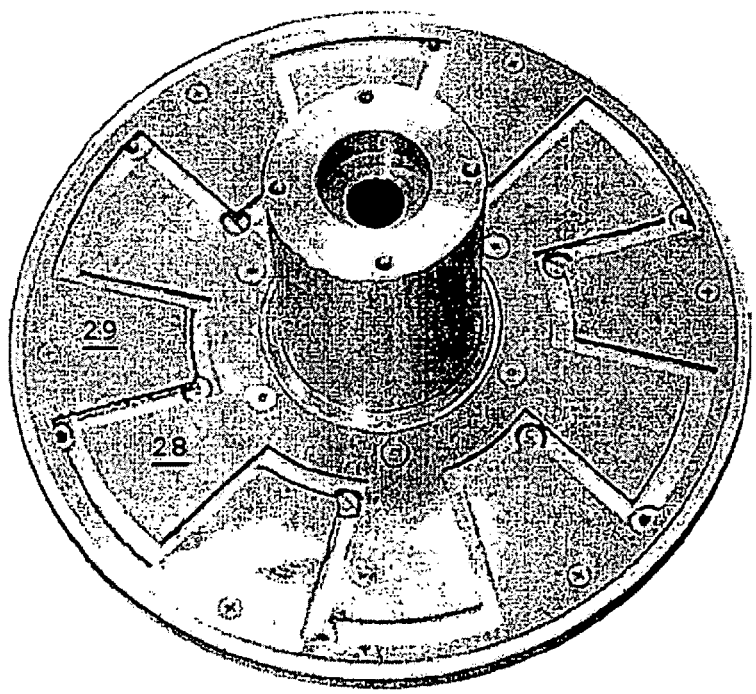
FIG. 2 shows a photograph of a complete rotor according to the invention.

In order to do this, and according to the preferred embodiment, the rotor or the stator are equipped with so-called 'flux-distribution plates', which are specially shaped plates made of magnetic material, placed in the path of the axial flux between rotor and stator, and which allow the changeover fluctuation to be reduced to a minimum. A possible shape of these plates 28, 29 when attached to the rotor, are illustrated in FIG. 2.

According to a further embodiment, the feature of flux distribution is obtained by shaping the permanent magnets themselves in a pre-defined way.

DETAILED DESCRIPTION OF A PREFERRED EMBODIMENT OF THE INVENTION

Figure 3A:
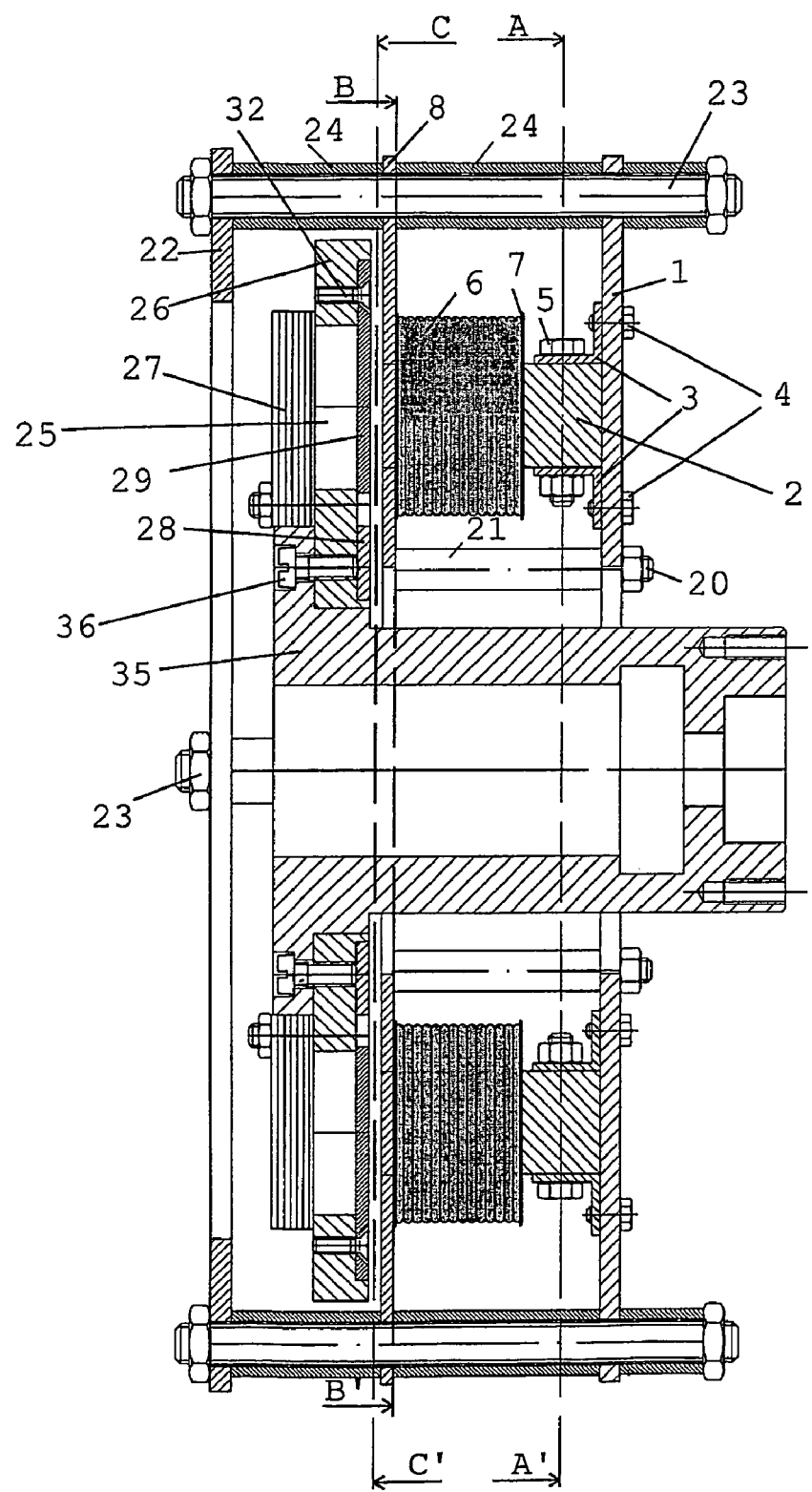
FIGS. 3a and 3b represent overviews of an axial flux generator/motor according to the invention.
Figure 5:
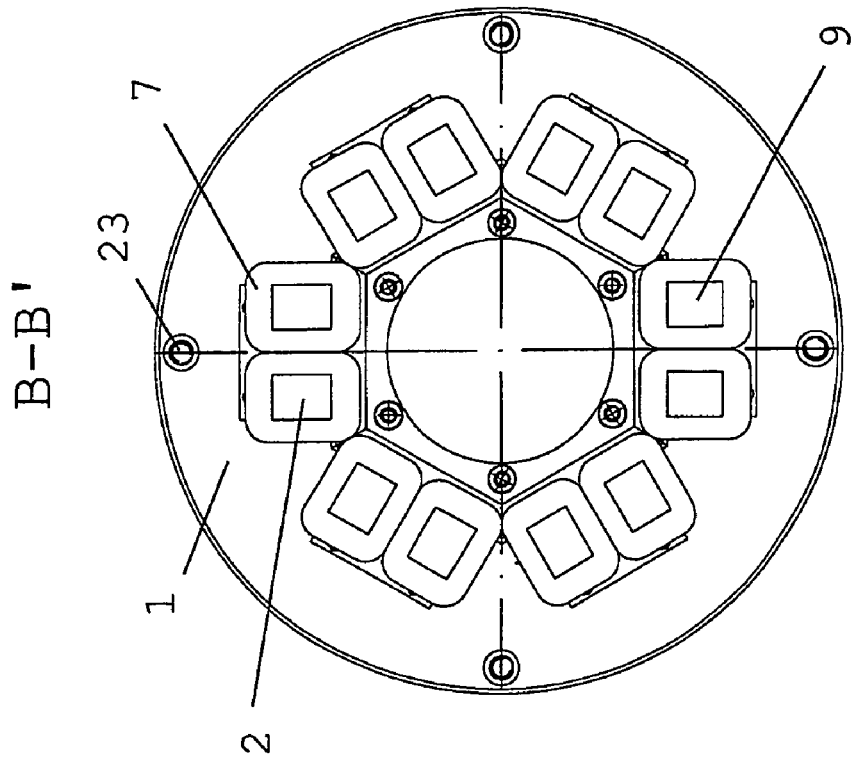

A preferred embodiment of the machine of the invention is shown in detail in FIG. 3a. It concerns a mono-phase disc permanent magnet generator, equipped with twelve cylinder-shaped permanent magnets 25 and flux-distribution plates 28,29 on the rotor. Sectional views indicated in FIG. 3 are shown in subsequent FIGS. 4 to 6. The stator comprises a disc 1, made of non-magnetic material, onto which six magnetic cores 2 are attached. These are U-shaped cores and can be any type of standard core, made of laminated magnetic material. They are attached to the disc 1 by a number of L-shaped profiles 3, bolted onto the disc 1 by bolts 4 and onto the cores 2 by bolts 5. The cores 2 are attached in such a way that the upstanding legs are essentially perpendicular to the disc 1.

The coils 6 are preferably wound round coil formers 7, which are then placed on the upstanding legs of the cores 2. A second non-magnetic disc 8 is preferably added opposite the first disc 1, so that both discs take care of the clamping of the cores with sufficient strength and of the jamming of the coils in the cores. Rectangular openings are present in the second disc 8 corresponding to the top surfaces 9 of the legs of the U-shaped cores.

The first and second disc (1,8) are held together by a set of bolts 20, in combination with tubes 21. This assembly is then attached through an additional set of bolts 23 and tubes 24 to a stationary plate 22, which represents the structure onto which the machine is installed.

The rotor is positioned in between this stationary plate 22 and the second disc 8. This rotor comprises a number of permanent magnets 25 with alternated orientation of north and south poles. The permanent magnets are cylinder-shaped. Standard magnets of this type may be used, such as loudspeaker magnets. The magnets are clamped into a non-magnetic circular disc 26.

Figure 6:
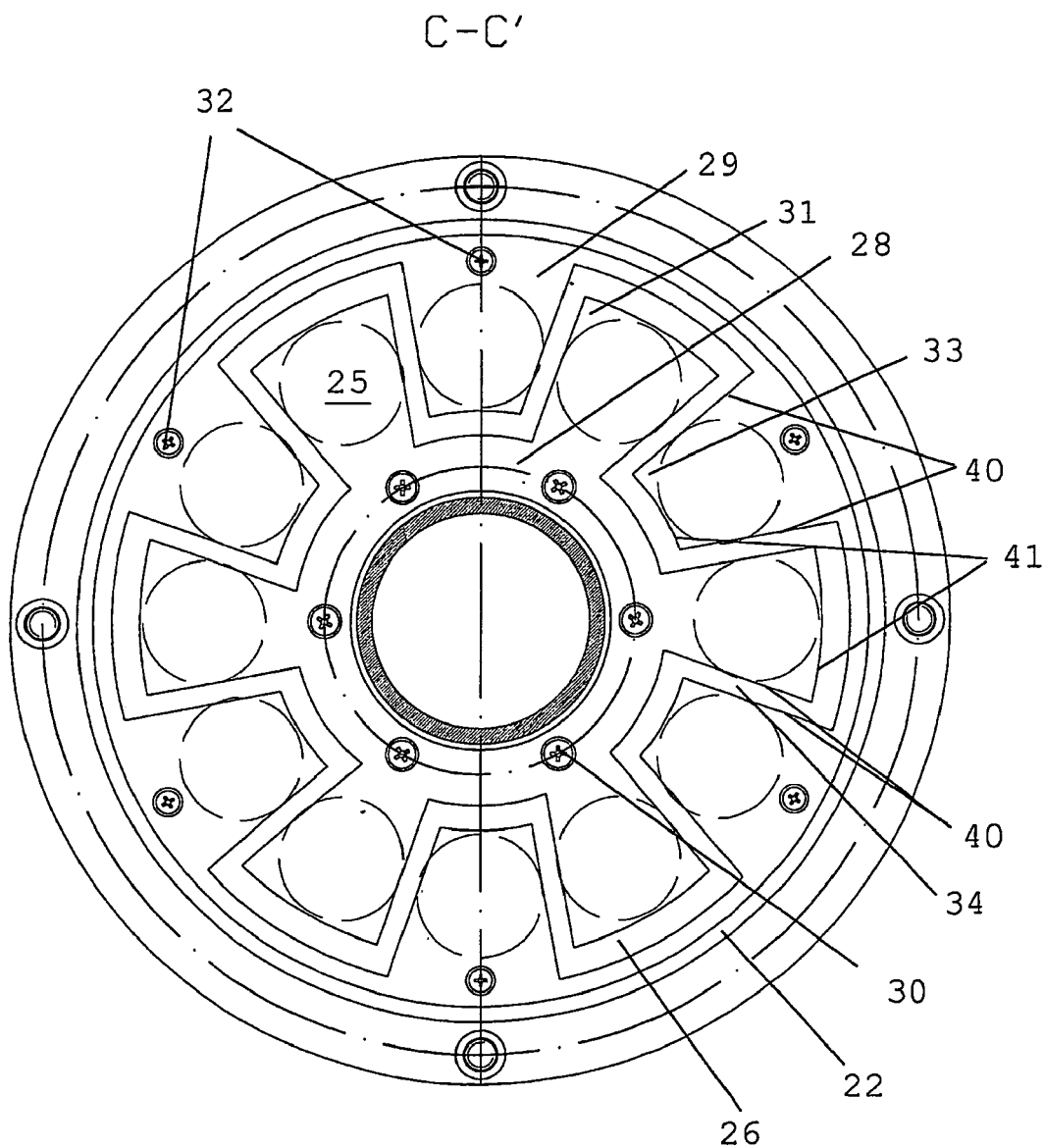
FIG. 6 represents a sectional view of the rotor of the invention, as shown in FIG. 3.

At the back of this non-magnetic disc 26, the permanent magnets are connected by a ring 27 of magnetic material, in order to create a magnetic path. On the surface directly facing the stator, the rotor is equipped with two flux distribution plates 28 and 29. These are best illustrated in FIG. 6 and on the photograph of FIG. 2. In FIG. 6, the magnets 25 are made visible, for clarity's sake. The flux distribution plates are made of magnetic material. Each plate is essentially a ring-shaped disc with radial extensions covering one type (north or south) of magnetic pole. The inner plate 28 is attached by bolts 30 to the rotor disc 26 and comprises radial extensions 31, which are pointing outward from the central ring into which the bolts 30 are present. Each of these extensions 31 covers the complete area of one type of permanent magnet. The outer plate 29 is equally bolted by bolts 32 to the rotor disc 26, and comprises radial extensions 33 which are pointing inward from the circumferential ring where the bolts 32 are present. The extensions 33 are covering the area of the remaining magnets, in between the magnets which are already covered by the inner plate 28. The surface of the extensions 31,33 is preferably larger than the surface of the magnets which they cover.

The specific contour of the extensions in this preferred embodiment can be seen to comprise two straight portions 40 and a circular portion 41, essentially concentric with the rotor. The straight portions 40 are not oriented along a radius of the rotor, but are at an angle to any rotor radius crossing said straight portions. As a consequence, the air gap 34 between two adjacent extensions is at an angle to the rotor radius. The reason for this is explained after this.

Every extension 31 of the inner plate 28 is adjacent an extension 33 of the outer plate 29. The air gap 34 between these flux distribution plates is larger than the air gap between the flux distribution plates and the magnetic material of the stator, in order to avoid flux lines crossing the air gap between flux distribution plates.

The function of these flux distribution plates is to mitigate the effect of the large fluctuation in air gap volume, as a consequence of the use of separate U-cores on the stator, which might otherwise lead to the problem of torque pulsation (cogging). For this purpose, the area of the extensions 31,33 is as large as possible, with the limitation that the air gap 34 between adjacent extensions needs to be larger than the air gap between rotor and stator. Furthermore, the air gap 34 between the flux distribution plates 28 and 29 is designed at an angle to the radius of the rotor, as a further measure against torque pulsation. This way, the changeover between two poles with different orientation can take place with a minimal variation in air gap volume between the flux distribution plates and the magnetic material of the stator.

The rotor disc is attached to a central part 35, which is to be connected to the machine axis. The connection between this central part and the rotor disc is supplied by bolts 36.

ALTERNATIVE EMBODIMENTS OF THE INVENTION

Figure 3B:
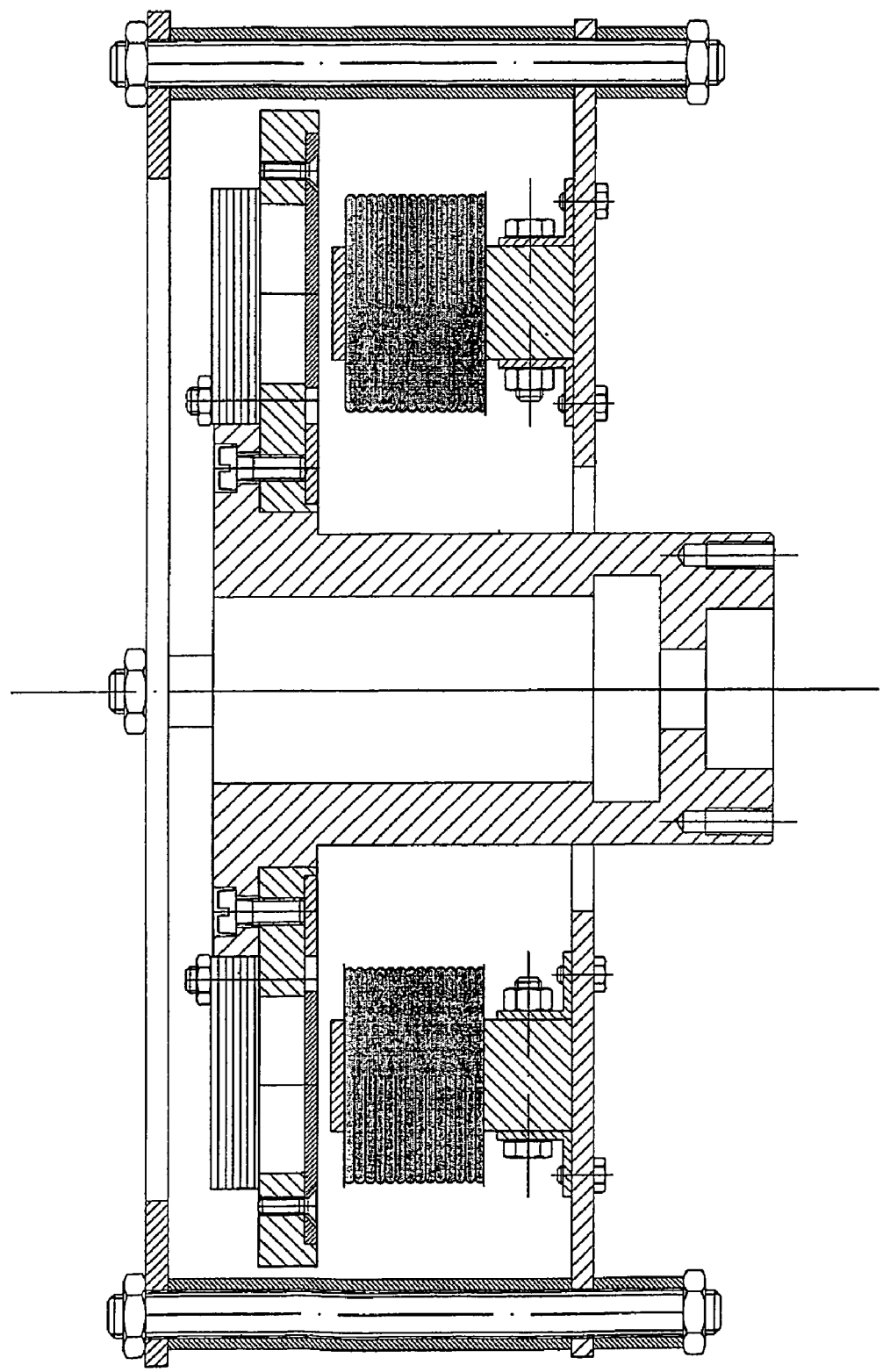
Figure 4:
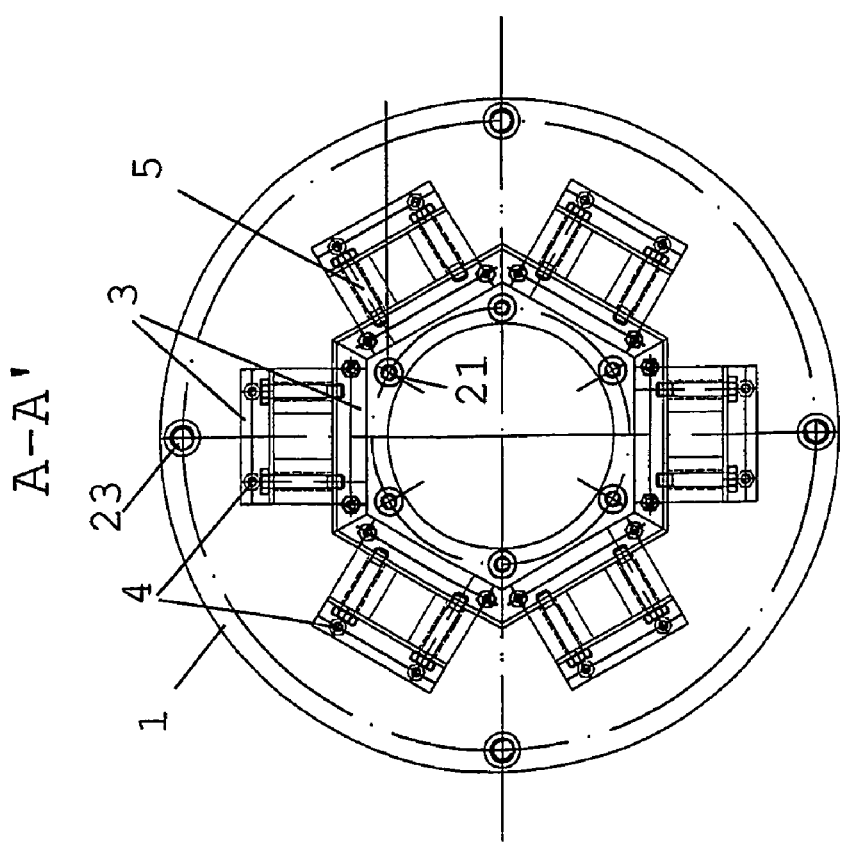

FIG. 3b shows a slightly modified embodiment which is essentially equivalent to the one shown in FIG. 3a, and wherein the second disc 8 has been omitted, along with the bolts 20 and tubes 21. In this embodiment, the clamping of the coils onto the cores is done by other attaching means, preferably by glueing the coils 6 to the cores 2.

The flux distribution plates may be attached to the stator, facing the rotor, instead of to the rotor. The same form of plates may be used in this case. The effect obtained by these plates, put onto the stator is exactly the same as in the above described case. Each extension 31 or 33 of one of both plates then covers at least the area of the cross-section of one leg of a core 2.

The form of flux distribution plates is not limited to the one shown in the figures. The main characteristic of such a plate is that it essentially covers at least the area of one rotor or stator pole. It is also possible to provide a separate flux distribution plate for every rotor pole.

The magnet arrangement is not necessarily based on a series of alternating north and south-oriented permanent magnets, but may also be based on groups of north-oriented magnets adjacent to groups of south-oriented magnets. This is the preferred case for example in a 3 or more phase machine according to the invention. One rotor pole then comprises a group of similarly oriented magnets. In this case therefore, flux distribution plates installed on the rotor may have fewer but larger extensions 31,33 which cover such a group of adjacent magnets of the same orientation. Alternatively, separate flux distribution plates may be installed, each covering one rotor pole.

Figure 7:
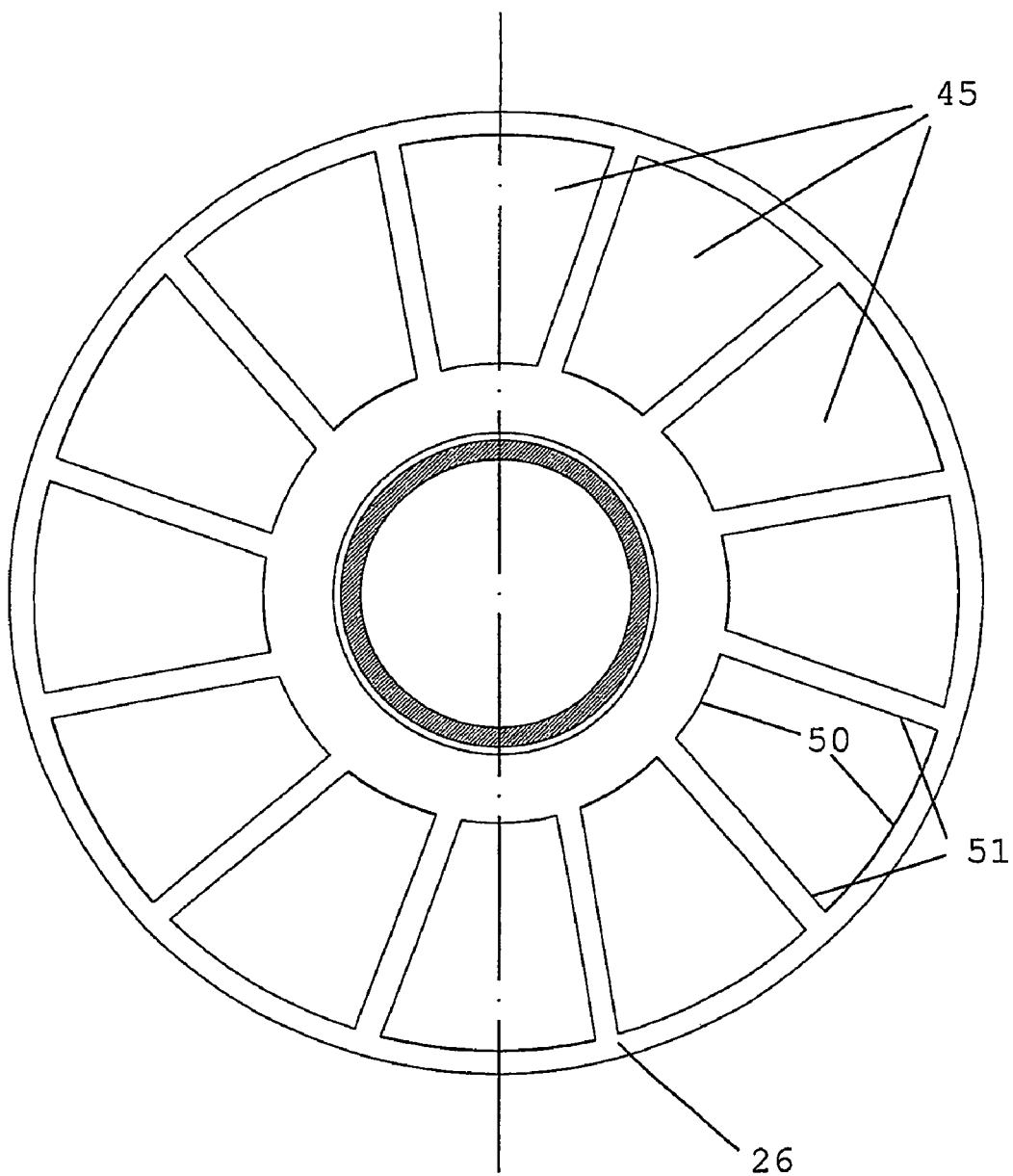
FIG. 7 represents a view of a rotor according to a second embodiment of the invention.

The flux may also be distributed in the same way by shaping the permanent magnets themselves in a given way. This effect is obtained by using magnets which have the shape of the radial extensions (31,33) of the flux distribution plates 28 and 29. A rotor of this kind, equipped with specially shaped magnets 45 is shown in FIG. 7. These magnets are then equally clamped into a non-magnetic disc 26. No flux distribution plates are required in this embodiment. The magnets of FIG. 7 have two concentric circular portions 50 and two connecting portions 51 between the end points of said circular portions. In this case, the connecting portions 51 are straight lines, which are not parallel to the rotor radius, in order to avoid torque pulsation.

For both the latter embodiment, as the one with flux distribution plates, it is not required that the adjacent edges of the extensions 31,33 or of the magnets 45 are straight lines. These edges may have any shape. It is however preferred that adjacent edges are parallel.

In order to adapt it to a 3 or more phase machine, the rotor of FIG. 7 may also comprise a smaller number of larger magnets 45, equally comprising portions 50, 51 but each taking up a larger space in the rotor's circumference.

Instead of U-shaped cores, E-shaped cores may be used.

In the machine shown in FIG. 3, it is not necessary to use permanent magnets in every position 25. It is also possible to have a rotor wherein every second position is filled by a permanent magnet. This may be a solid permanent magnet or a permanent magnet made of laminated material. For example, all magnets having their north pole at the left in FIG. 3 may be replaced by a disc made of magnetic material, preferably laminated magnetic material. Because it is not required to have permanent magnets at every position 25 around the rotor, as shown in FIG. 6, these positions may more generally be called 'locations', to be filled in either by permanent magnets or_by elements of laminated magnetic material of the same or other shape as the permanent magnets.

The ring 27 at the back of the rotor is preferably formed of a laminated material.

To limit the magnetic losses in the flux distribution plates 28,29 these plates or at least part of these plates preferably comprise 'interruptions' perpendicular to the plate's plane surface. In general, the plate may be said to comprise a series of adjacent strips of magnetic material, lying next to each other, and thereby making up the plate or a part of the plate.

Figure 8:
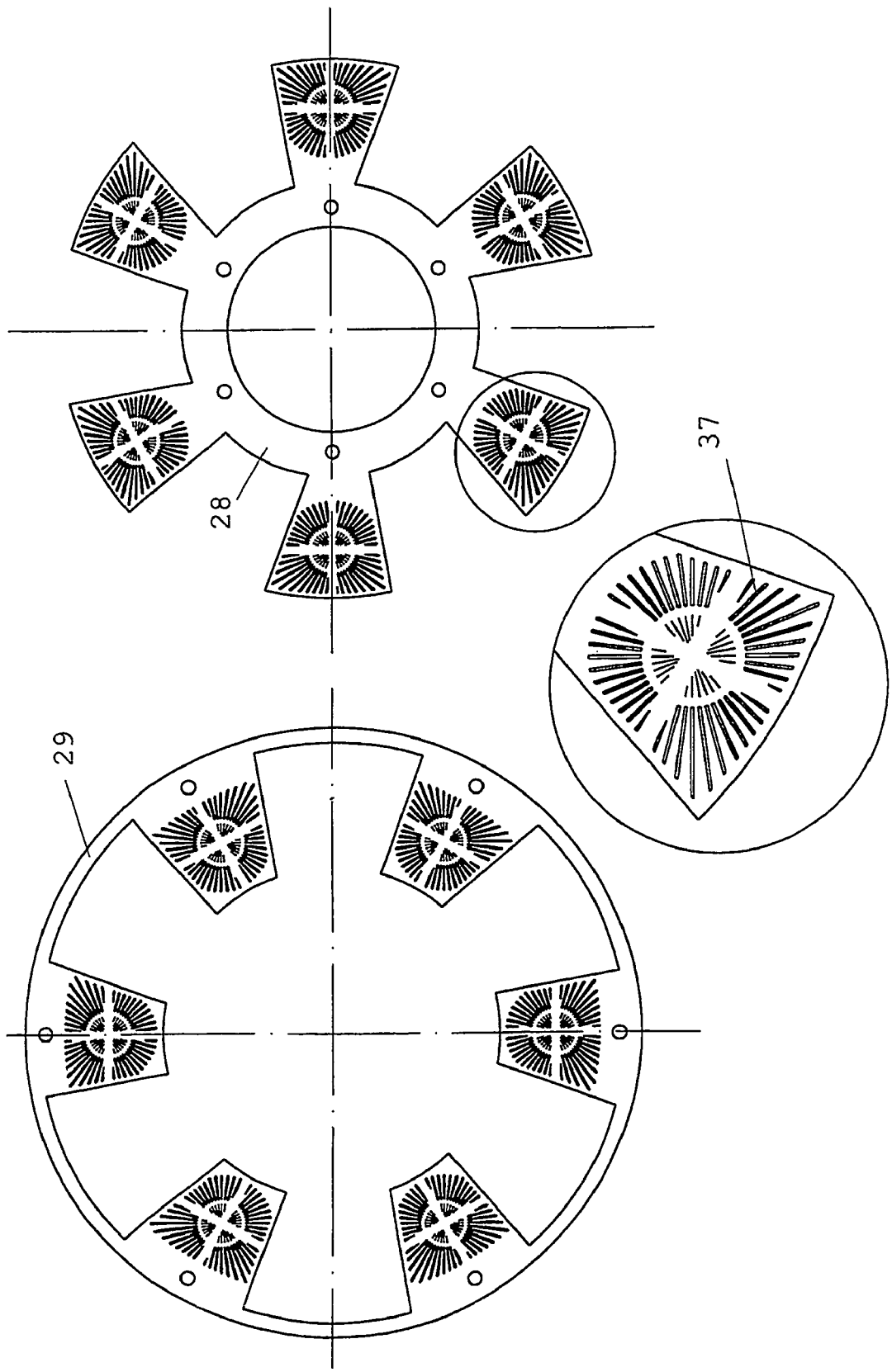
FIG. 8 represents a view of a pair of flux distribution plates, which comprise cuts.

In the preferred embodiment, the plates are machined, for example by a laser tool, in order to form cuts 37 which go through the complete thickness of the plates and which are located at least in those parts of the plate facing the rotor poles, see FIG. 8. Parts on either side of such a cut 37 are understood to be the 'adjacent strips' in the more general description.

Figure 9:
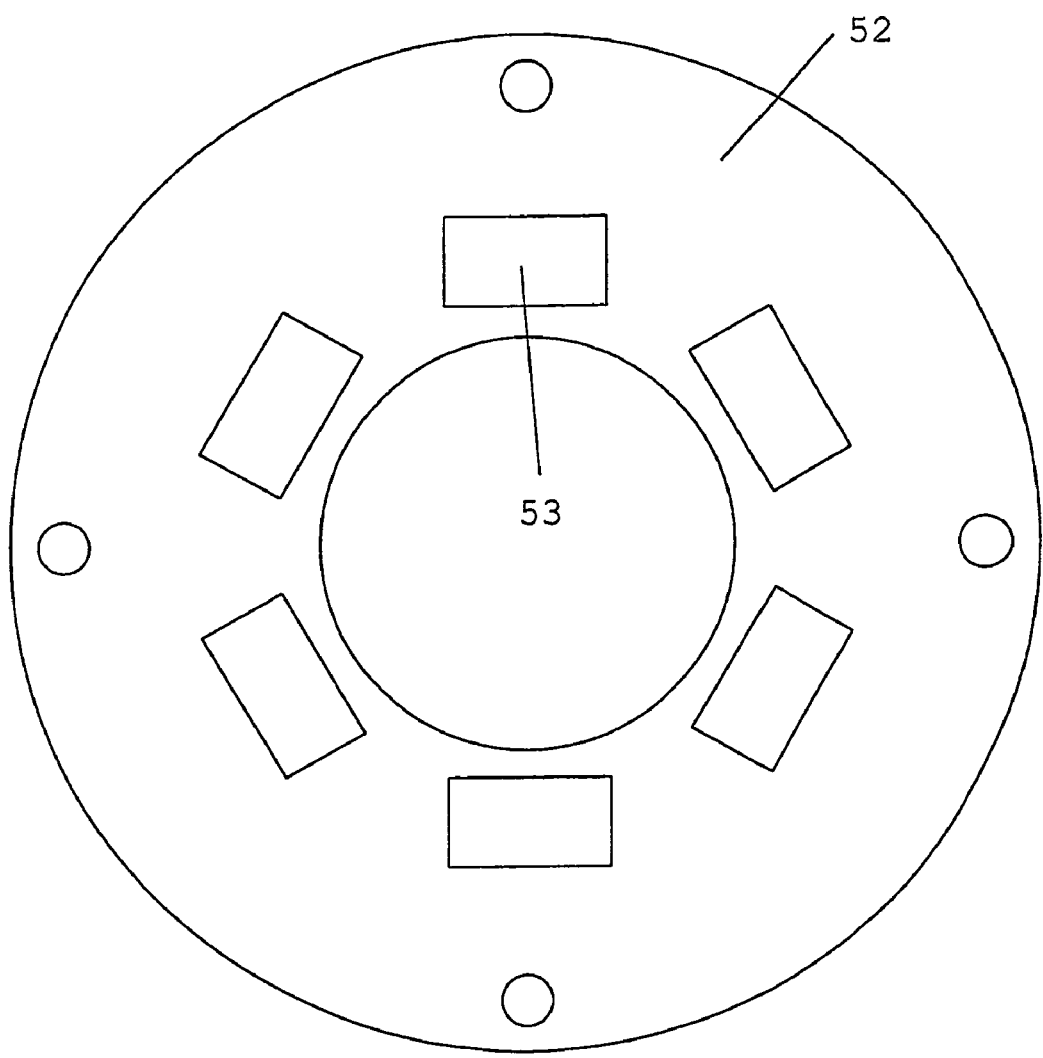
FIG. 9 represents a view of a ring of laminated magnetic material, which can be installed on the stator in case of a 3 or more phase machine.

In a special design for the 3 or more phase machines the magnetic cores of the stator can be magnetically combined by layered rings of magnetic material. FIG. 9 shows such a layered ring 52, comprising open spaces 53 which are to be placed over the cores 2 on the stator. The ring 52 is then placed in between the disc 1 and the coil formers 7.

For the 3 or more phase system, a special rotor construction can be made so that the machine works as a switched reluctance motor or generator without the use of permanent magnets on the rotor. All of the rotor poles can then be built by elements of magnetic material, preferably laminated, with a special design resembling the radial extensions 31, 33 in order to produce the same effect as with the flux distribution plates, or by preferably laminated magnetic elements, equipped with flux distribution plates as described above. For the switched reluctance machine the pole number of the rotor differs from the pole number of the stator. The equilibrium position of the rotor (minimal reluctance) turns with the alternate excitation of the different stator poles.

Figure 10:
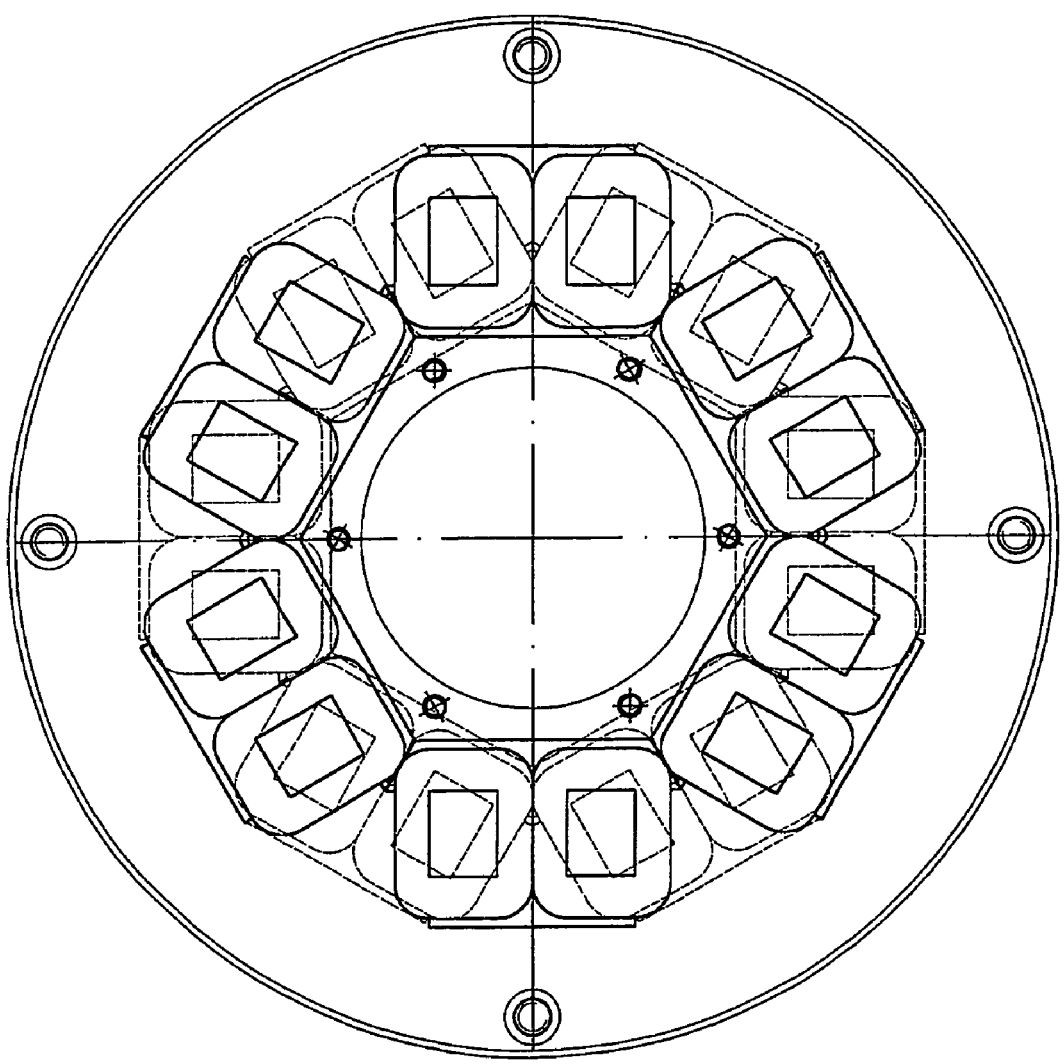
FIG. 10 illustrates the rotation of one stator with respect to the other, in the embodiment of the invention comprising two stators.

It is also possible to make a twin type of machine by replacing the stator construction at the front of the rotor by two similar stator constructions one at each side of the rotor. For this design, the rotor does not need the magnetic ring 27 at the backside since the magnetic path is already closed at each side of the rotor by the magnetic cores of the stator. The flux distribution plates 28,29 however or the special design of the permanent magnets have to be present at both sides of the rotor for this construction. According to the preferred embodiment, the stators are rotated over an angle with respect to each other, around the rotational axis, as is illustrated in FIG. 10. This is preferred in order to reduce torque pulsations.

The machine can only generate a controlled output voltage if an electronic converter is being used. The converter works in "boost-mode" at low speed and as a rectifier at high speed. For the 3-phase construction, the electronic converter has the additional function of motor control when the machine is used as a motor.

It is possible to generate a 3-phase output with the 1-phase construction by using 3 electronic converters each on a 1-phase output.

To reduce the weight of the machine, it is possible to make the coils 6 of the stator with aluminium foil instead of with copper wire.

The invention claimed is:

1. A permanent magnet electrical generator/motor comprising a stator, a rotor, a rotational axis and an air gap between the stator and the rotor so that the magnetic flux across said air gap is substantially oriented along said rotational axis, said rotor comprising a plurality of locations for placing permanent magnets or elements of magnetic material to form rotor poles, said generator/motor comprising a first disc of non-magnetic material or of magnetic material covered by insulation, and a plurality of magnetic cores, said cores being attached to said first disc by attachment means, said cores comprising upstanding legs around which coils are wound, said upstanding legs defining stator poles, said generator/motor including a plurality of flux distribution plates intermediate the stator and the rotor, said plates being made of magnetic material, each flux distribution plate covering at least an area of the rotors or stator poles.

2. A generator/motor according to claim 1, comprising an inner and an outer flux distribution plate, made of magnetic material, said plates comprising radial extensions, the extensions of the inner plate pointing radially outward with respect to the machine's rotational axis, and the extensions of the outer plate pointing radially inward, so that each extension of said inner plate is adjacent an extension of said outer plate, with an air gap in between each pair of said adjacent extensions.

3. A generator/motor according to claim 2, wherein the edges of said air gap, which are formed by the edges of two adjacent extensions are parallel to each other.

4. A generator/motor according to claim 2, wherein said flux distribution plates are attached to the rotor, and wherein each of said extensions covers at least the area of one permanent magnet location.

5. A generator/motor according to claim 2, wherein said cores comprise a plurality of upstanding legs around which said coils are wound, and wherein said flux distribution plates are attached to the stator, wherein each of said extensions covers at least the area of the cross section of one leg of a core.

6. A generator/motor according to claim 2, wherein the contour of said extensions comprises two straight portions, and a circular portion connecting said two straight portions, so that two adjacent straight portions of two adjacent extensions are parallel to each other and at an angle to any radius of said rotor which is crossing said two adjacent straight portions.

7. A generator/motor according to claim 1, wherein said flux distribution plates comprise adjacent strips of magnetic material.

8. A generator/rotor according to claim 7, wherein said flux distribution plates comprise cuts through the complete thickness of the plates, in those parts of the plates which face the rotor poles.

9. A generator/motor according to claim 1, wherein a separate flux distribution plate is provided for every rotor pole.

10. A generator/motor according to claim 1, wherein said means for attaching said cores to said first disc comprise L-profiles and bolts.

11. A generator/motor according to claim 1, further comprising a ring of magnetic material, connected to the rotor on the side apposite the stator.

12. A generator/motor according to claim 1, further comprising a second non-magnetic disc, said cores being present between said first and second disc.

13. A generator/motor according to claim 1, wherein said coils are attached to said cores by gluing.

14. A generator/motor according to claim 1, further comprising a second stator, which is placed opposite the first stator on the other side of said rotor.

15. A generator/motor according to claim 14, wherein said second stator is rotated over an angle around the rotational axis of said generator/motor, with respect to said first stator.

16. A generator/motor according to claim 1, further comprising at least one electronic converter, which works in "boost-mode" at low speed and as a rectifier at high speed.

17. A generator/motor according to claim 1, wherein the rotor comprises in every one of said locations, a permanent magnet.

18. A generator/motor according to claim 1, wherein the rotor comprises in said locations a plurality of permanent magnets and a plurality of elements made of magnetic material.

19. A generator/motor according to claim 1, wherein the rotor comprises only elements made of magnetic material and placed into said permanent magnet locations, in such a way that the number of rotor poles is different from the number of suitor poles.

20. A generator/motor according to claim 1, wherein said cores are U-shaped cores or E-shaped cores.

21. A generator/motor according to claim 1, further comprising a ring made of laminated magnetic material, said ring connecting the cores of said stator.

* * * * *